(No Model.)
W. ONDERDONK.
PROCESS OF PREPARING CEREALS.
No. 526,256. Patented Sept. 18, 1894.
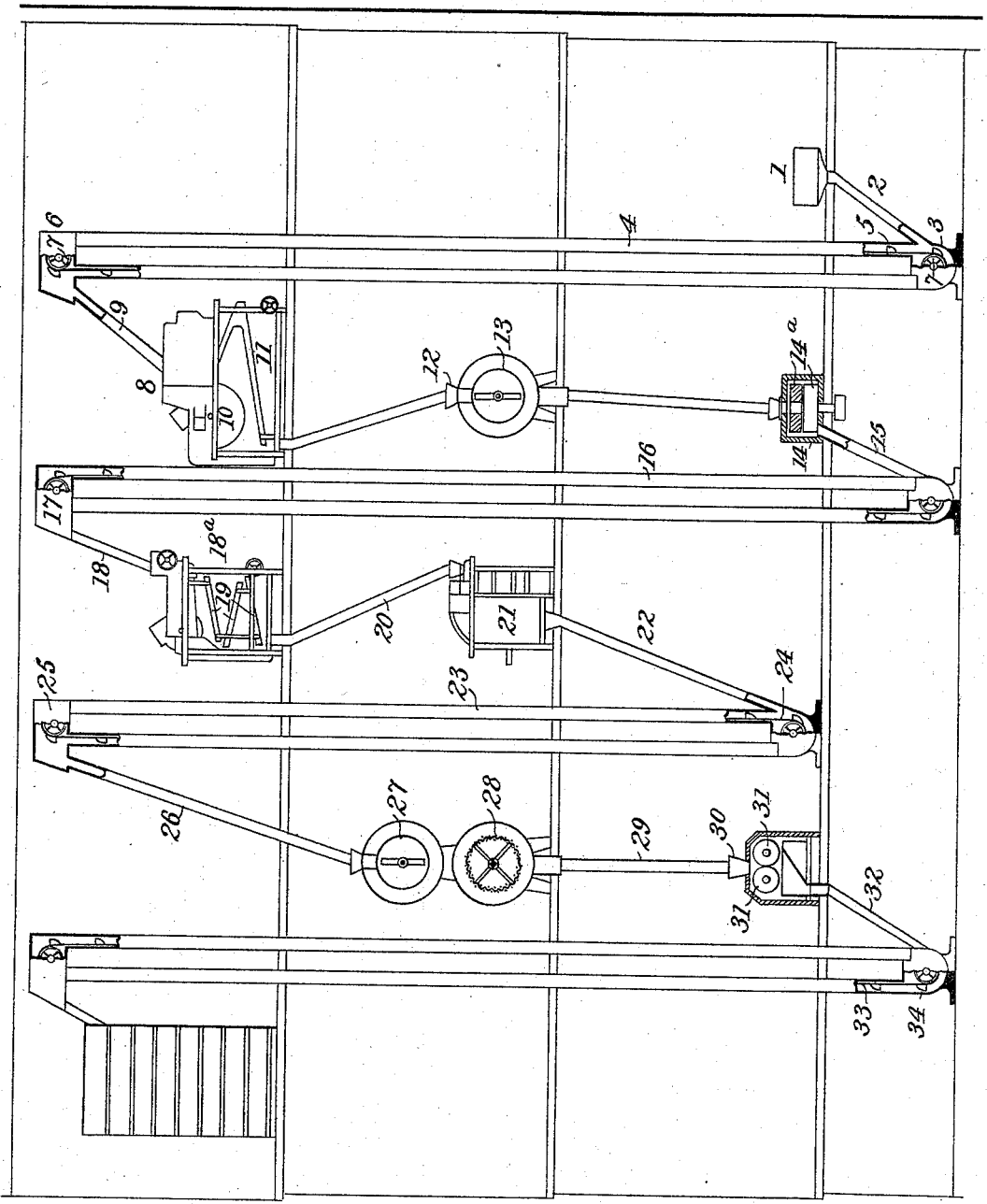
Witnesses
Jno G. Hinkel
A. N. Dobson
Inventor
William Onderdonk
By Foster Freeman
Attorneys

UNITED STATES PATENT OFFICE.

WILLIAM ONDERDONK, OF NEW YORK, N. Y.

PROCESS OF PREPARING CEREALS.

SPECIFICATION forming part of Letters Patent No. 526,256, dated September 18, 1894.

Application filed December 14, 1893. Serial No. 493,682. (No specimens.)

*To all whom it may concern:*

Be it known that I, WILLIAM ONDERDONK, a citizen of the United States, residing in the city, county, and State of New York, have invented certain new and useful Improvements in Process of Preparing Cereals, of which the following is a specification.

This invention relates to certain new and useful improvements in process of preparing grain and like cereals, substantially as will hereinafter be more particularly described.

The object of the invention is to prepare grain and like cereals in such manner that the same may be sold in the market as an edible article and requiring but a slight additional heating or cooking to complete their condition or readiness for the table. Other objects will also appear hereinafter.

In the accompanying drawings I have represented a general plant or construction of apparatus employed in the practice of my improved process.

Heretofore in the preparation of grain and like cereals as an article of food, it has been the practice to first subject the cereals to a drying process in a kiln or drying pan before removing the hulls therefrom, and then after milling the cereals or reducing them to what is known as "groats," the latter are finally subjected to the action of steam for the purpose of effecting their partial cooking. In the treatment referred to, the grain or other cereals are subjected to the direct action or contact of hot air generated by the heating furnace, and, as such heated air is always mixed or impregnated more or less with injurious gases a large proportion or percentage of these gases is absorbed by the cereals, and the latter thereby become very much impaired both in quality and flavor and are very frequently rendered unwholesome as an article of food. Again, in some instances, it has been the practice to subject the material to the direct action of steam for a similar purpose, but similarly in such processes the grain or other cereals become so saturated with water as to make them starchy and very indigestible, and they are besides deprived of their sweetness and require too much subsequent treatment or manipulation to bring them to the state or condition desired.

In the practice of my present invention, I first separate or remove all dust or chaff therefrom and then I take the grain or other material in its natural or raw state as when brought from the field, and subject the same to the action of dry heat in a closed vessel or chamber. In other words, the grain or other material is brought into contact with heat by radiation rather than by heated air directly from the fire, the vessel or chamber itself being heated from the fire rather than the material under treatment, and the said vessel is preferably of some non-porous substance, as malleable iron for instance.

The above first step of my invention is for the purpose of thoroughly drying the material without robbing it of any of its inherent qualities, and after being so treated the grain or like cereals is then subjected to a milling action by friction so as to thoroughly remove the hulls therefrom. Next to the first heating and the milling operation, I pass the material into a second heating or what in this instance may be termed a roasting apparatus, and there such material is again subjected to a strong dry heat by radiation to such an extent as to become thoroughly penetrated to the center of the berry or kernel. At this stage the cereal or grain is in a softer condition and more easily acted upon by the heat, and thus it will be seen that the starchy matter of the grain is turned into dextrine which renders the article very much more digestible. Furthermore, by this second heating or roasting of the grain or like material, all insect germs will be effectually destroyed, besides removing all moisture and making it possible to keep the material in any climate and for an indefinite length of time without becoming musty or moldy. The flavor and sweetness of the cereals will be maintained, and they will otherwise be reduced to a far more acceptable and desirable article of food.

Referring to the accompanying drawing, 1 represents a receiving hopper into which the grain or like material is fed fresh just as it is brought in from the fields. From such hopper the said material falls by gravity down through an inclined chute 2 and is deposited at the base or boot 3 of an elevator shaft 4, in which is arranged and works an endless elevating apparatus having a series of buckets 5. The number of these buckets may be regulated as desired and they may be spaced such distance apart as to deliver the material in the proper quantities and at required intervals.

Arranged at both the base or boot 3 of the shaft 4, and the head 6 is a pulley 7 over which the endless elevator passes, and at the head 6 is arranged or located a separator 8, which receives the material from a chute 9, leading to the same from the said elevator head. The said separator is constructed of any well known forms, such for instance as are provided with shaking screens onto which the material falls. A fan or air blower 10 is arranged beneath the separator, preferably at or near its forward end, so that while the material is being fed upon the separator a blast of air will be forced up through the same and blow away or carry off all loose hulls, chaff, or dirt.

Falling from the separator onto an incline 11 beneath, the separated grain or other material passes down through a hopper 12, leading to a drying or roasting cylinder 13, which is surrounded by an outer casing or chamber receiving heated air or steam from any suitable source of supply. In this cylinder the material receives its first heating or drying as hereinbefore explained; and from such it passes down into a revolving or rotary mill 14, consisting of a hollow pan or vessel in which two or more stones 14$^a$ are caused to rotate. The material is rubbed in this mill to such an extent that its hulls become loosened and fall off by frictional rubbing or contact.

When the grains have had their hulls all removed in the manner described they have been brought to the condition known as "groats," and these together with the loose hulls that have just been removed are then allowed to pass from the mill 14, down through a chute 15 to the base or boot of a second elevator shaft 16, having also an elevator provided with buckets in like manner as the elevator first named. The material is carried up by this second elevator and delivered at the head 17, through a chute 18 to a second separator 18$^a$. This second separator is preferably provided with a series of shaking screens 19, as shown, onto which the material falls, while a blower is also arranged beneath similarly as with the separator first mentioned. The blast of air produced by this second blower will carry off all the loose hulls and dirt from the grain, and convey them in any suitable manner to a bin or other collecting device; while at the same time the fresh clean groats will pass from one of the screens to the other until it enters the chute 20 which conveys the same to a polishing or brushing machine 21. This machine may be constructed in any of the well known ways to subject the material as it passes through to a scrubbing or polishing action by means of rotating brushes or cylinders. I do not herein represent any specific details of machinery for the purpose since any machine for such purpose now in use will be found suitable.

Passing from the brushing or polishing machine the grain or other material enters a chute 22 leading down to the boot or base of a third elevator shaft 23, from whence such material is conveyed by a third elevator 24 to the head 25 of the shaft and thence through a chute 26 to the second drying or roasting apparatus 27. This second drying or roasting kiln or apparatus may be constructed in any well known way, but preferably is of the form and construction for which application for Letters Patent, Serial No. 468,453, were allowed me on September 13, 1893. Generally speaking, this apparatus consists of a stationary outer case containing an inner revolving case or cylinder, the space between the two being supplied with heated air or steam while the grain or material is fed to the interior revolving case or cylinder. From the revolving heating chamber, the material passes into a cooler arranged beneath so that the material may be delivered in the desired state or condition. This reference to the said apparatus will, it is thought be sufficient herein for the purposes of the present invention. The thoroughly cleaned groats now pass through the revolving heating or drying cylinder while at the same time they are subjected to agitation by means of revolving agitators in said cylinder. From this drying cylinder 28 they pass into the cooling cylinder (which is supplied with cold air by means of a blower) beneath, where they are restored to the proper temperature for crushing, and then they fall down through a chute 29 and are delivered to a hopper 30 which supplies the same between a pair of crushing rolls 31 revolving in opposite directions. By the action of these rolls the groats are converted into flakes of a pure, sweet natural flavor, and which are finally delivered through a chute 32 to the boot or base of a fourth elevator shaft, having an elevator 33 provided with conveyers or buckets 34, which lift or carry the flakes up to a delivery hopper leading into a storing bin where they are received all ready to be put up in proper packages or boxes and placed on the market. It will be seen that the grain or cereal is not handled at any stage of the process, thereby contributing largely as a labor saving process. The material produced by the process simply requires a very slight further heating or cooking by the persons purchasing the same, whereupon it is ready for the table in an edible condition.

The several different apparatus or parts of apparatus employed by me may be constructed in any of the well known ways, except the second and final roaster which is preferably constructed as already explained. The different parts may all be properly connected so as to be driven or operated from a single source of power.

Without limiting myself to the precise details herein shown and described, I claim—

The process herein described of preparing grain and like cereals, the same consisting in first removing the dust and chaff therefrom, and drying the same, then removing the hulls, and separating the latter from the groats, then scrubbing and polishing the groats, and roasting them to the center, and finally reducing the groats to flakes, as set forth.

In testimony whereof I have signed my name to this specification in the presence of two subscribing witnesses.

WILLIAM ONDERDONK.

Witnesses:
   CHAS. V. MOORE,
   PHILIP REDDY.